United States Patent [19]

Aida et al.

[11] 4,221,042

[45] Sep. 9, 1980

[54] COVERED WIRE WRAPPING TOOL

[75] Inventors: Masaaki Aida, Yokohama; Takashi Kobayashi, Fujisawa; Yukinori Taneda, Yokohama; Noboru Sugimoto, Yokosuka, all of Japan

[73] Assignee: Hitachi, Ltd., Japan

[21] Appl. No.: 931,401

[22] Filed: Aug. 7, 1978

[30] Foreign Application Priority Data

Aug. 10, 1977 [JP] Japan ................................ 52-95063

[51] Int. Cl.$^2$ ................................ H02G 1/12

[52] U.S. Cl. ................................ 29/564.4; 29/33 F; 81/9.5 A

[58] Field of Search ................ 29/33 F, 33 M, 564.1, 29/564.4, 751, 753; 81/9.5 R, 9.5 A

[56] References Cited

U.S. PATENT DOCUMENTS 3,845,536 11/1974 Kobayashi et al. ................ 29/564.4

3,897,617 8/1975 Ackerman et al. ................ 29/564.4

3,967,357 7/1976 Bolssens et al. ...................... 29/751

*Primary Examiner*—Gil Weidenfeld

*Attorney, Agent, or Firm*—Craig & Antonelli

[57] ABSTRACT

A covered wire wrapping tool comprising a covered wire-cutting and cover-stripping device for cutting an elongated continuous covered wire into covered wires of a predetermined length and for stripping covers from a leading and trailing end portions of a severed covered wire, and a wrapping bit device including a single bit having therein an eccentric groove into which the cover-stripped leading and trailing end portions formed by the covered wire-cutting and cover-stripping device are successively loaded. The bit with the cover-stripped leading or trailing end portion loaded in the eccentric groove is rotated to wrap and connect the cover-stripped leading or trailing end portion about and to a terminal of an electrical component.

5 Claims, 18 Drawing Figures

COVERED WIRE WRAPPING TOOL

BACKGROUND OF THE INVENTION

The present invention relates to a covered wire wrapping tool for cutting an elongated continuous covered wire into covered wires of a predetermined length, stripping covers from the leading and trailing end portions of a severed covered wire, and wrapping the cover-stripped leading and trailing end portions of the covered wire about respective terminals of electrical components of electronic computers, electronic exchange systems, control panels and the like, thereby attaining the electrical interconnections between the terminals of the components.

As disclosed, for instance, in U.S. Pat. No. 3,845,536, a conventional covered wire wrapping tool includes a leading end wrapping bit for wrapping the cover-stripped leading end portion of the covered wire about a terminal of an electrical component and a trailing end wrapping bit for wrapping the cover-stripped trailing end portion of the covered wire about a terminal of an electrical component. When the wrapping connection of the cover-stripped leading end portion of the covered wire to a terminal of an electrical component is completed by the wire leading end wrapping bit, the latter is retracted behind the wire trailing end wrapping bit so that the latter can wrap the cover-stripped trailing end portion of the covered wire about a terminal of another electrical component. However, the conventional covered wire wrapping tool is unsatisfactory in its operability and cannot efficiently interconnect the terminals of electrical components, because the wire leading end wrapping bit and the wire trailing end wrapping bit are respectively disposed in different positions and must be alternately successively changed in their operating positions. In addition, the conventional covered wire wrapping tool includes two wrapping bits as discussed above, and must be provided with mechanisms for independently moving back and forth the two wrapping bits in such a way that when one of them is in operative position the other may be retracted to and held in inoperative position so as not to interfere the wrapping operation of the former. As a result, similar devices and mechanisms are required for respective wrapping bits so that a number of parts is increased and consequently the covered wire wrapping tool becomes large in size, heavy in weight and poor in operability in practice. Furthermore much time and many labors are required for maintenance and adjustments.

SUMMARY OF THE INVENTION

Accordingly, a principal object of the present invention is to provide a covered wire wrapping tool in which an elongated continuous covered wire is cut into covered wires of a predetermined length; covers are stripped from the leading and trailing end portions of a severed covered wire; and the cover-stripped leading and trailing end portions are continuously and successively wrapped about terminals of electrical components by a single bit to interconnect the terminals, and in which the size of the tool can be made compact; the weight of the tool can be made light; the interconnections between the terminals can be provided without the change in wrapping operating position; the operability can be remarkably improved to increase the operating efficiency.

According to the present invention, there is provided a covered wire wrapping tool, comprising: a covered wire-cutting and cover-stripping device including cutter blades for cutting an elongated continuous covered wire into covered wires of a predetermined length, stripper blades for stripping the covers from a leading and trailing end portions of a cut covered wire, a clamp device for clamping each of the leading and trailing end portions, and means for moving said stripper blades relative to said clamp device to strip the covers from the leading and trailing end portions of the cut covered wire; a wrapping bit device including a single bit having in the tip thereof a terminal receiving bore, an eccentric groove open outwardly at a location eccentric to said bore and long extending axially, and an opening extending radially through said bit from the end of said eccentric groove, a movable sleeve at least partially surrounding the outer periphery of said bit and reciprocally movable axially thereof, and a style guide reciprocally movable over the outer periphery of said movable sleeve and having a groove within the tip of said style guide for receiving the leading end portion of the covered wire, said groove having a rear open end; a guide device for guiding the leading end portion formed by said covered wire-cutting and cover-stripping device to introduce the leading end portion into said opening in said bit, and for guiding the trailing end portion to introduce the same into said eccentric groove in said bit; and said movable sleeve being advanced to pass the cover-stripped leading end portion through said groove in said style guide to bend the cover-stripped leading end portion by the tip of said movable sleeve, thereby to load the cover-stripped leading end portion into said eccentric groove in said bit, said movable sleeve being advanced to load the trailing end portion as it is into said eccentric groove in said bit, and the rotation of said single bit wrapping and connecting the leading and trailing end portions about and to respective terminals of electrical components.

BRIEF DESCRIPTION OF THE DRAWINGS

FIG. 10 shows that the cover-stripped leading end portion of the covered wire is advanced by a predetermined length so that it is inserted into an opening of a bit;

FIG. 11 shows that a movable sleeve is advanced from a position illustrated in FIG. 10 so that the leading end portion is inserted into an eccentric groove of the bit;

FIG. 2 shows a position subsequent to the position of FIG. 11, in which a terminal of an electric component to be connected is inserted into a terminal bore in the bit, and the bit is rotated to wrap the leading end portion about the terminal;

FIG. 13 shows a position subsequent to the position of FIG. 12, in which the bit is moved to a location of a terminal of another electrical component to be connected;

FIG. 14 shows that in a position of FIG. 13 the leading end portion is clamped and the covered wire-cutting and cover-stripping device is advanced after the determination of a length of the covered wire;

FIG. 15 shows a position subsequent to the position of FIG. 14, in which cutting blades and stripping blades are actuated and the covered wire-cutting and cover-stripping device is retracted to remove the cover on the trailing end portion therefrom;

FIG. 16 shows a position subsequent to the position of FIG. 15, in which a guide device is actuated to introduce the trailing end portion into the eccentric groove of the bit;

FIG. 17 shows a position subsequent to the position of FIG. 16, in which the movable sleeve is advanced to load the trailing end portion into the eccentric groove of the bit, and the trailing end clamp, the style guide and so on are retracted; and FIG. 18 shows a position subsequent to the position of FIG. 17, in which a terminal of another electrical component to be electrically connected is inserted into the terminal bore in the bit, and the bit is rotated to wrap the trailing end portion about the terminal of another electrical component.

DESCRIPTION OF THE PREFERRED EMBODIMENT

Figure 1:
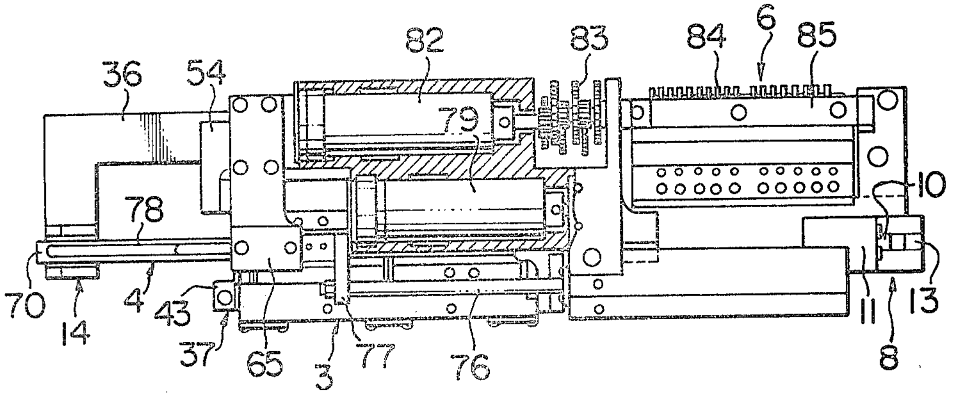
FIG. 1 is a top view, partly in section, of a preferred embodiment of a cover wire wrapping tool in accordance with the present invention.
Figure 2:
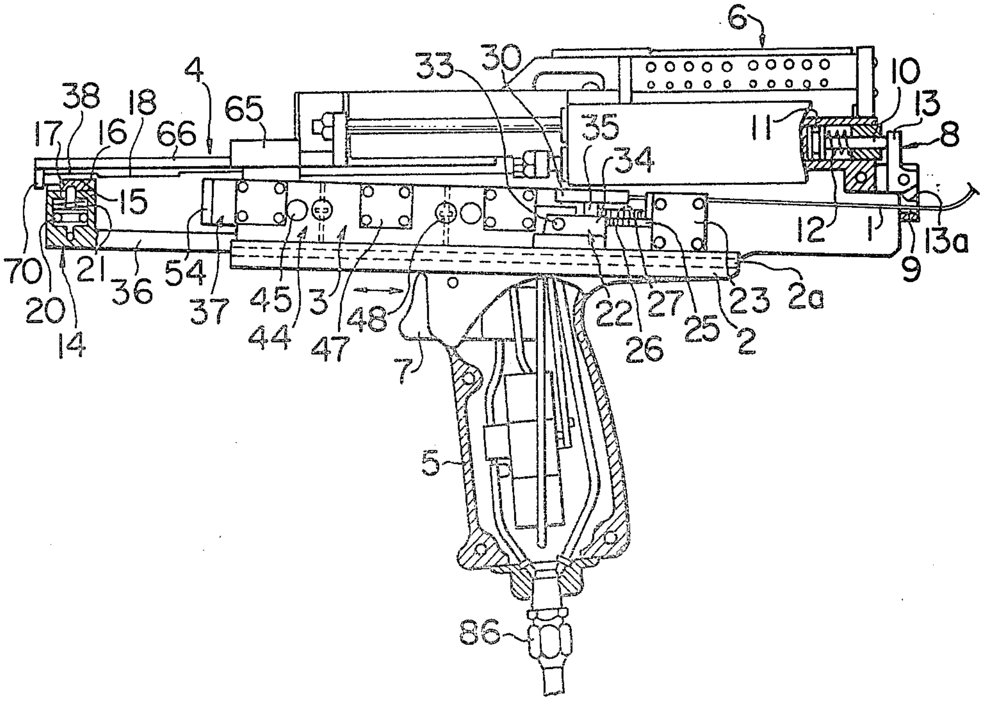
FIG. 2 is a front view, partly in section, thereof.
Figure 3:
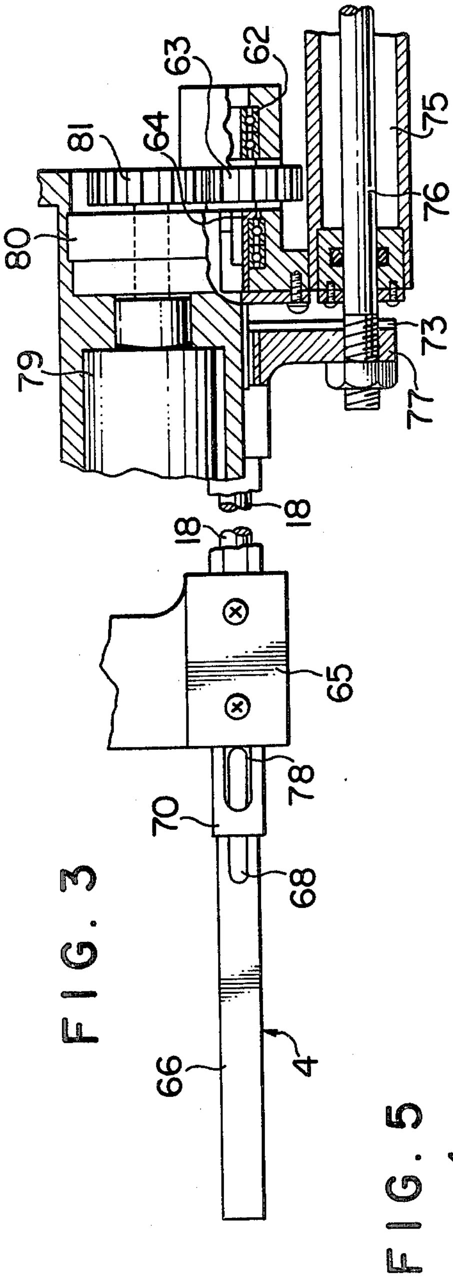
FIG. 3 is a fragmentary top view, on enlarged scale and partly in section, of a wrapping bit device of the tool shown in FIG. 1.
Figure 4:
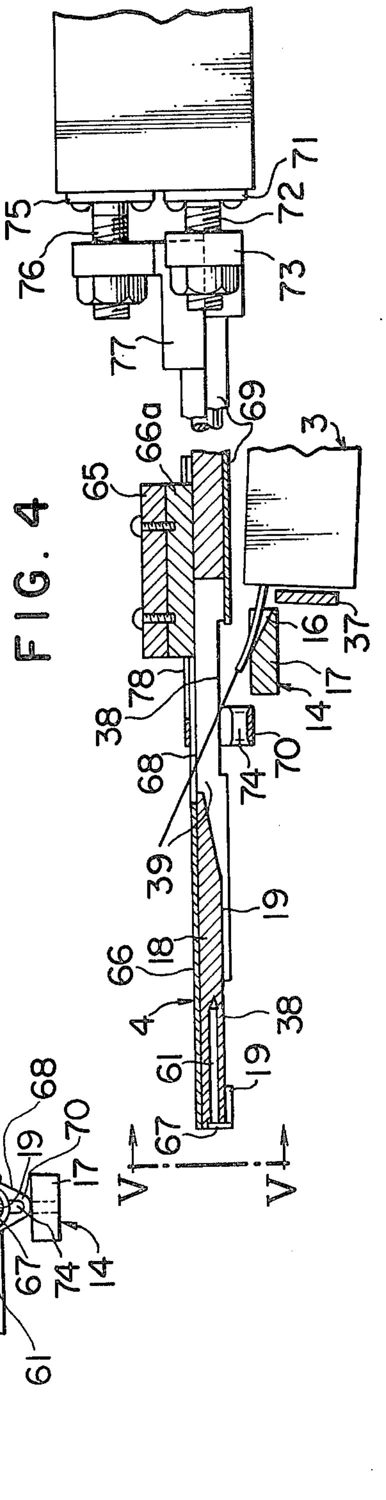
FIG. 4 is a front view, partly in section, thereof.
Figure 5:
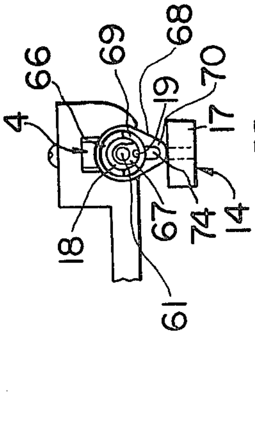
FIG. 5 is a left side view thereof.

Referring to FIGS. 1–9, a preferred embodiment of a covered wire wrapping tool in accordance with the present invention will be described. Reference numeral 1 denotes an elongated continuous covered wire, 2, a frame; and 3, a covered wire-cutting and cover-stripping device which is mounted for slidable movement in the direction indicated by a double-pointed arrow in FIG. 2 on a guide rail 2*a* which in turn is mounted on the frame 2 and is inclined at a small angle upwards towards the left in FIG. 2. The cutting and stripping device 3 has cutters or cutter blades 50 for cutting off the covered wire 1 into covered wires of a predetermined length, stripper blades 51*a* for stripping or removing the cover from the leading end portion of a cut covered wire and stripper blades 51*b* for stripping or removing the cover from the trailing end portion of the severed covered wire. 4 is a wrapping bit device for continuously loading or feeding the leading and trailing end portions of the cut covered wire formed by the covered wire-cutting and cover-stripping device 3 into an eccentric groove 19 to wrap the cover-stripped leading and trailing end portions about respective terminals of electrical components. A grip 5 is formed integral with the frame 2 so that an operator can grip the tool with his hand to operate the tool. A sequencer 6 is mounted on the frame 2 and is operable to change and control a group of control valves for controlling air cylinders, an air motor and so on by means of the rotation of a group of cams connected to the air motor. An on-off switch 7 is attached to the upper front side of the grip 5 and is used for turning on or off the air motor which actuates the sequencer 6, to operate the tool.

Next the feature and arrangement of the covered wire-cutting and cover-stripping device 3 will be described in detail. It includes a first clamp device 8 mounted on the frame 2 for clamping the leading end of the covered wire. The clamp device 8 includes a wire feed hole 9 through which the covered wire 1 is passed, a cylinder 11, a piston reciprocable within the cylinder and having a piston rod 10 connected to the piston, and a clamping lever 13 engaged with the piston rod 10. When the cylinder 11 is actuated, the piston rod 10 urges and swings the lever 13 in the clockwise direction so that the covered wire 1 is clamped between the tip 13*a* of the clamping lever 13 and the opening of the wire feed hole 9. When the cylinder 11 is released, the piston rod 10 is retracted under the force of a spring 12 so that the clamping lever 13 is swung in the counterclockwise direction, releasing the covered wire 1.

The stripping and cutting device 3 also includes a second clamp device 14 for clamping the trailing end of the covered wire, which is substantially similar in construction and mode of operation to the first clamp device 8 described above. That is, when a cylinder 20 is energized, its piston rod 15 is extended so that a clamping block 17 which is securely attached to the free end of the piston rod 15 and which is formed with an inclined surface 16 may be raised so as to clamp the trailing end portion of the wire between the clamping block 17 and a flat portion 38 of the eccentric groove 19 (See FIG. 4). When the cylinder 20 is de-energized, the piston rod 15 is retracted under the force of a return spring 21 so that the clamping block 17 is moved away from the flat portion 38, thereby releasing the trailing end portion of the wire. The second clamp device 14 is attached to the leading end of an L-shaped arm 36 which in turn is mounted on the frame 2 for slidable movement.

Figure 6:
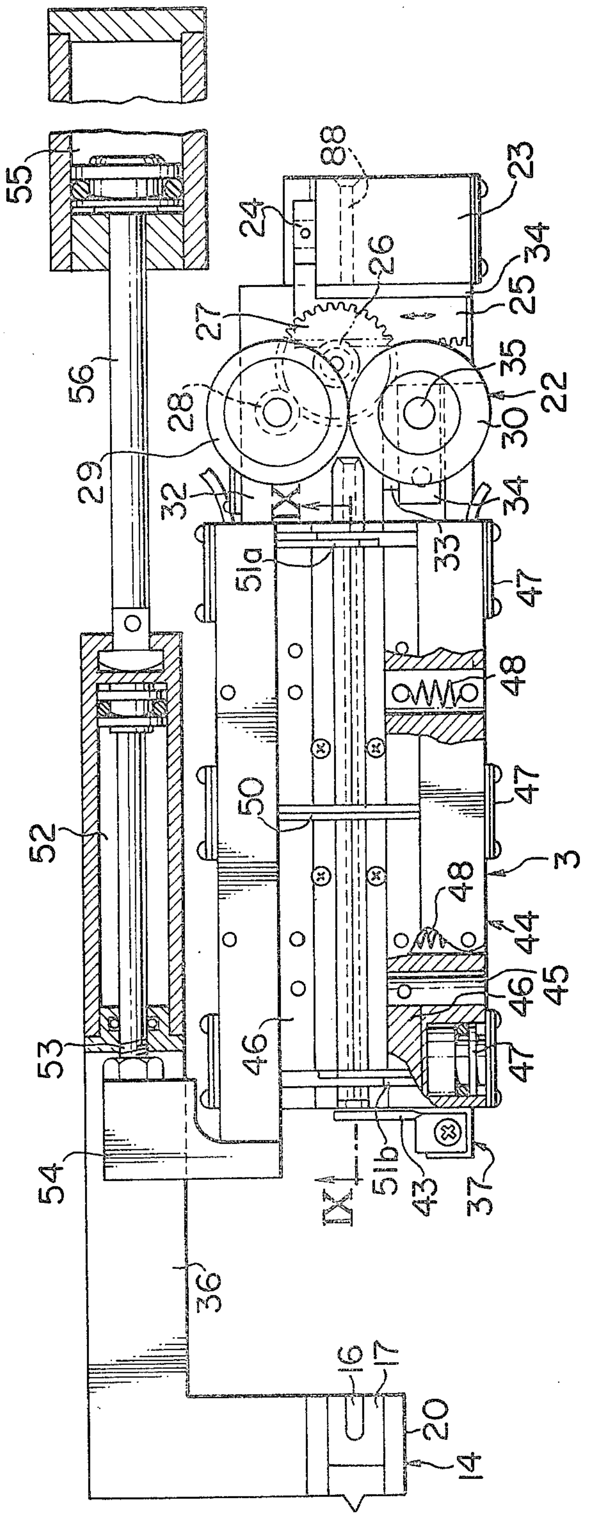
FIG. 6 is a top view, partly in section, of a covered wire-cutting and cover-stripping device of the covered wire wrapping tool shown in FIG. 1.
Figure 7:
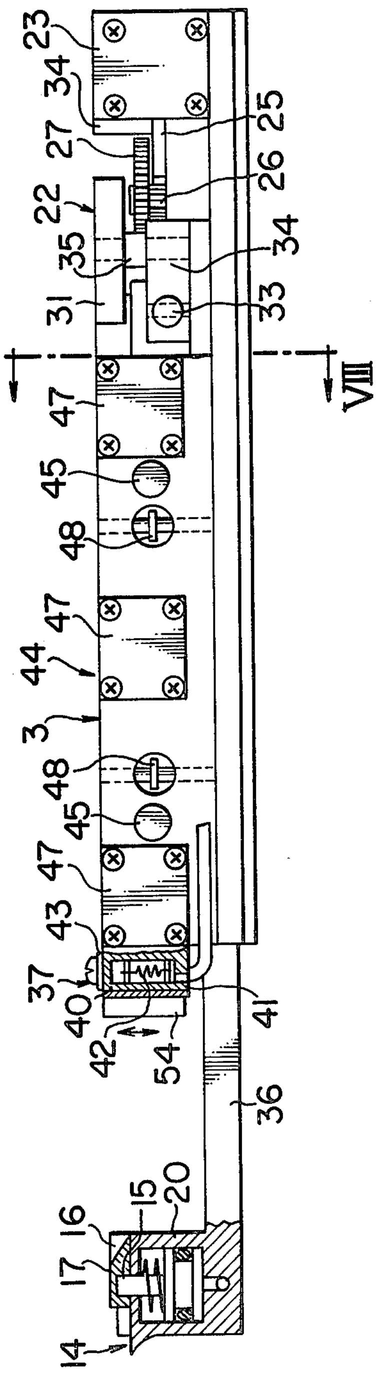
FIG. 7 is a front view, partly in section, thereof.

Referring particularly to FIGS. 6 and 7, the covered wire-cutting and cover-stripping device 3 further includes a covered wire feeding device 22 mounted on a body 44 of the device 3. The wire feeding device 22 includes a cylinder 23 whose piston rod 24 is connected to one end of an L-shaped rack 25 which is guided by a guide plate 31 for slidable movement in the directions indicated by a double-pointed arrow in FIG. 6 as the piston rod 24 is extended or retracted. The rack 25 is in mesh with a pinion 26 which is integral with a gear 27 in mesh with a toothed wheel or gear 28. A feed roller 29 which is mounted coaxially of the gear 28 is made of a metal and has a knurled or rough peripheral side surface. A feed roller 30 has its periphery fitted with an elastic ring and is rotatably mounted on a shaft 35 which in turn is mounted on a slide block 34 securely attached to the free end of a piston rod 33 of a cylinder 32 so that the feed roller 30 may be moved toward or away from the metal feed roller 29 as the piston rod 33 is retracted or extended. When the elastic feed roller 29 is pressed against the metal feed roller 30 with the wire 1 clamped therebetween and when the rack 25 is displaced by a predetermined stroke, the metal roller 29 is rotated so that the wire 1 may be fed or advanced through a predetermined length.

The covered wire 1 extends from the covered wire feed device 22 through openings 49 formed in the body 44 of the covered wire-cutting and cover-stripping device 3 to a guide device 8. The body 44 includes therein a pair of cutter blades 50 between which the covered wire passes, and two pairs of stripper blades 51*a* and 51*b* axially spaced away from each other through a predetermined distance with the pair of cutter blades 50 positioned intermediately of the two pairs of stripper blades 51*a* and 51*b*. One of the pair of cutter blades 50 and one of each pair of stripper blades 51*a*, 51*b* are attached to a block 46 slidably supported by means of a pin 45. Air cylinders 47 cooperate with springs 48 to reciprocally move the block 46 in the direction shown by the double-pointed arrow, thereby to open and close the pair of cutter blades 50, the pair of leading end portion stripper blades 51*a* and the pair of trailing end portion stripper blades 51*b*. The block 46 has attached to the upper left hand end thereof an L-shaped arm 54 which is securely attached to the free end of a piston rod 53 of an air cylinder 52. The base of the air cylinder 52 as well as one end of an L-shaped arm 36 is securely attached to the free end of a piston rod 56 of an air cylinder 55.

Figure 9:
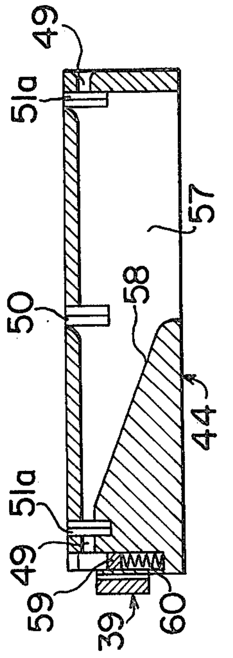
FIG. 9 is a sectional view taken along the line IX—IX of FIG. 6.
Figure 8:
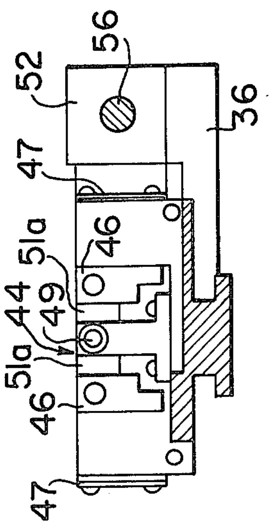
FIG. 8 is a sectional view taken along the line VIII—VIII of FIG. 7.

As best shown in FIG. 9, the body 44 has therein a chamber 57 located below the passages 49 for the covered wire 1. The chamber 57 is communicated with a vacuum source (not shown). An inclined surface 58 is formed adjacent to the chamber 57 so that the cover stripped or removed from the end portions of the cut covered wire may be easily dropped and removed out of the chamber 57.

The inclined surface 16 formed in the clamping block 17 of the trailing end portion clamp device 14 serves as a guide to introduce the cover-stripped leading end portion of the covered wire formed by the covered wire-cutting and cover-stripping device 3 as described previously, into the opening 39 formed within the bit 18 of the wrapping bit device 4.

As shown in FIG. 7, a cylinder member 40 with a closed top is disposed for vertically slidable movement in the directions indicated by a double-pointed arrow, and a spring 42 is loaded between a stationary member 41 secured to the body 44 and the cylinder member 40 to bias the cylinder member downwards. A bent plate member 43 is securely attached with a screw to the upper end of the cylinder member 40. Air is supplied to raise the cylinder member 40 so that the upper end of the plate member 43 pushes the trailing end portion of the covered wire 1 toward the bit 18. In order to prevent the core wire of the trailing end portion of the covered wire 1 from being directed in the transverse direction when the plate member 43 pushes upwards the trailing end portion of the covered wire 1 emerging out of the passage 49 in the body 44, a block 59 formed therein with a groove whose width is gradually narrowed upwardly is vertically slidably supported at the left end of the body 44 so that the block 59 may be pushed upward by a spring 60 (See FIG. 9).

Next the feature and arrangement of the wrapping bit device 4 including a single bit for continuously successively wrapping and connecting the core wires of the leading and trailing end portions of the covered wire formed by the covered wire-cutting and cover-stripping device 3 about and to respective terminals of electrical components will be described. The bit 18 is formed with a relief groove 67 at the leading end and a terminal receiving bore 61 extending through the axis of the leading end for receiving a terminal of an electrical component. The U-shaped eccentric groove 19 is formed eccentrically of the terminal receiving bore 61. The groove 19 is opened outwardly and extends rearwardly from the tip of the bit 18. The flat portion 38 is formed so as to cross the eccentric groove 19 at a portion slightly behind the tip of the bit and at a further back portion. The opening 39 is formed so as to be communicated with the rear end of the eccentric groove 19 and to cross or extend through the bit. The rear end of the bit 18 is integrally connected through a sleeve 64 to a shaft of a gear 63 rotatably supported by bearings 62. (See FIG. 4) To a supporting block 65 which is securely mounted on the frame 2 with screws or the like and which is extended above the bit 18 is fixed a projection 66*a* on the rear end of a stationary sleeve 66 which is half-split so as to cover the upper half of the bit 18 and supports a movable sleeve 69 and a style guide 70 in such a way that they may be slidable in the axial direction. The stationary sleeve 66 is formed with a slot 68 in a corresponding relationship to the opening 39 of the bit 18. The movable sleeve 69 is half-split so as to cover the lower half portion of the bit 18 and is movable back and forth to open and close the eccentric groove 19 of the bit 18. The movable sleeve 69 has a lower rear end which is securely attached to a block 73 connected to a piston rod 72 of an air cylinder 71, and a forward and or tip formed with a shallow groove so as to prevent the rotation of the covered wire during the wrapping operation.

The style guide 70 has within the tip thereof at a location corresponding to the eccentric groove 19 of the bit 18 a groove 74 which is relatively shallow in depth and which serves as a guide for the covered wire 1. The style guide 70 also has a rear portion that is semi-circular in cross-section. The style guide 70 is supported so as to be slidable back and forth along the outer peripheries of the stationary and movable sleeves 68 and 69. The rear end of the style guide 70 is securely attached to a block 77 which in turn is connected to a piston rod 76 of an air cylinder 75. The upper side of the style guide 70 is formed with an elongated slot 78 for relieving the projection 66*a* of the stationary sleeve 66. In addition, a gear 63 is in mesh with a gear 81 connected to an air motor 79 through a clutch 80 which stops the rotation of the gear 81 at predetermined angular positions. The rotation of the gear 63 rotates the bit 18.

The sequencer 6 is arranged such that the group of cams 84 having a number of cams arranged on a shaft are driven to be rotated by an air motor 82 which is energized and de-energized by a switch 7, and that each change-over valve of the group of change-over valves 85 having a number of change-over valves engaged with and actuated by the cams of the group of cams 84 respectively is changed over to control the tool. An air pipe 86 is connected to the tool to supply air thereinto for controlling the sequencer 6 and the tool, and is flexible to enable the tool to be freely moved.

Figure 10:
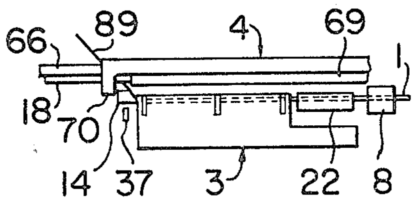
FIGS. 10–18 are schematic diagrammatic views used for the explanation of the sequential steps of the wrapping operation with the covered wire wrapping tool in accordance with the present invention.

Next the mode of operation of the covered wire wrapping tool with the above construction will be described. The elongated continuous covered wire 1 is first inserted into the feed hole 9 of the leading end portion clamp device 8, extended through a passage 88 of the covered wire feed device 22 and gripped by the pair of metal and elastic feed rollers 29 and 30. The covered wire leaving the pair of feed rollers 29 and 30 is inserted into the passages 49 in the body 44. Then, the switch 7 is depressed to actuate the air cylinder 11 of the leading end portion clamp device 8 so that the clamping lever 13 is swung in the clockwise direction in FIG. 2 to clamp the leading end portions of the covered wire 1. Thereafter, the air cylinders 47 on the body 44 are actuated to close the cutting blades 50, the leading end portion stripping blades 51*a* and the trailing end portion stripping blades 51*b*, thereby to cut the covered wire 1 and dig into the cover of the covered wire 1. Next air is supplied to the air cylinder 52 to move the body 44 from the right to the left along the guide rail 2*a* so as to form a core wire of the leading end portion 89. The stripped cover drops along the inclined surface 58 into the vacuum chamber 57 and is sucked and removed out of the chamber 57 by vacuum. Thereafter, the air cylinder 23 of the covered wire feed device 22 is actuated to move the rack 25, thereby to rotate the gears 26, 27 and 28 in order, so that the metal feed roller 29 is rotated through a predetermined revolution to feed the covered wire 1 nipped between the rollers 29 and 30 through a predetermined length. The core wire 89 of the leading end portion is changed in advancing direction by the inclined surface 16 of the clamping block 17 of the trailing end portion clamp device 14 so that the core wire 89 is advanced upwardly and is passed through the opening 39 in the bit 18 until the protruded portion of the core wire 89 from the opening 39 has a predetermined length as shown in FIG. 10.

Figure 11:
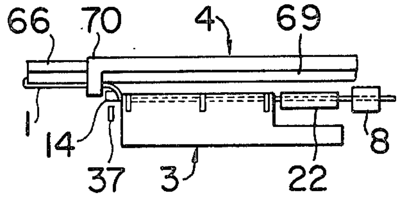
Figure 12:
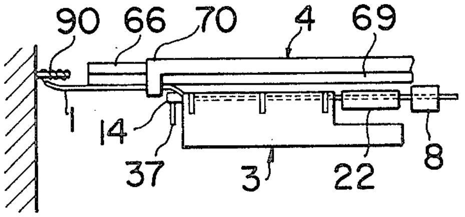

Next the air cylinder 71 is actuated to move the movable sleeve 69 toward the leading end of the bit 18 so that the core wire 89 of the leading end portion is bent and inserted into the eccentric groove 19 in the bit, and the wire 1 is inserted into the groove 74 within the tip of the style guide 70 as shown in FIG. 11.

Figure 13:
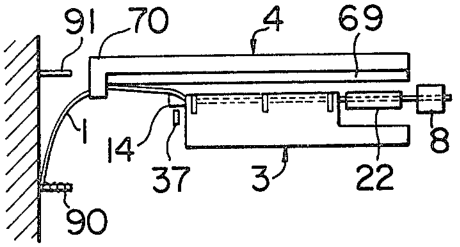

With the condition illustrated in FIG. 11, the terminal receiving bore 61 in the bit 18 is fitted over a terminal 90 of an electrical part, and the switch 7 is operated to actuate the air motor 79 thereby to turn the bit 18 so that the core wire 89 of the leading end portion of the covered wire 1 is wrapped about the terminal 90 and the wrapping operation is completed. Thereafter, the switch 7 is operated to actuate the air cylinder 75 to move the tip of the style guide 70 to the tip of the bit 18. With the condition, the tool is moved until the tip of the bit 18 is located in the same position of a terminal 91 of an electrical component to be electrically connected while the covered wire 1 is drawn through the groove 74 formed within the tip of the style guide 70, thereby to determine the length of the covered wire 1. This is shown in FIG. 13.

Figure 14:
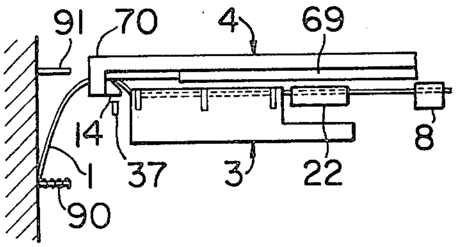
Figure 15:
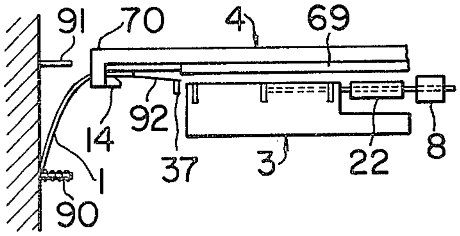

Then, the switch 7 is operated again to stop the supply of air into the air cylinders 47 so that under the forces of the return springs 48, the cutting blades 50, the leading end portion stripping blades 51*a* and the trailing end portion stripping blades 51*b* are opened. Thereafter, the air cylinder 32 is actuated to move the elastic feed roller 30 away from the metal feed roller 29. With the condition, the air cylinder 55 is actuated to displace both the trailing end portion clamp device 14 and the main body 44 toward the tip end of the bit 18 while the movable sleeve 69 is retracted to its initial position as shown in FIG. 14. The air cylinder 20 is actuated to raise the clamping block 17 thereby to clamp the trailing end portion of the covered wire 1. Thereafter, the cutting blades 50, the leading end portion stripping blades 51*a* and the trailing end portion stripping blades 51*b* are closed and the air cylinder 52 is actuated to displace the body 44 from the left to the right to form a core wire 92 of the trailing end portion as shown in FIG. 15.

Figure 16:
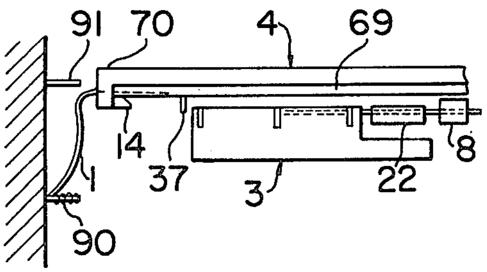

The air under pressure is introduced into the cylinder member 40 to move upwards the plate member 43, thereby raising the core wire 92 of the trailing end portion of the covered wire 1 along the groove in the block 59 so as to insert it into the eccentric groove 19 of the bit 18. When the movable sleeve 69 is displaced forwards, the core wire 92 of the trailing end portion is withdrawn within the movable sleeve 69 and held within the eccentric groove 19 without extending outwards as shown in FIG. 16.

Figure 17:
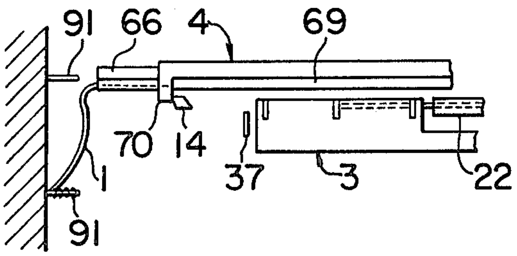

Thereafter, the trailing end portion clamp device 14 and the style guide 70 are retracted as shown in FIG. 17 so that the core wire 92 of the trailing end portion 91 may be ready to be wrapped about the terminal 91 of the electrical component as shown in FIG. 17.

Figure 18:
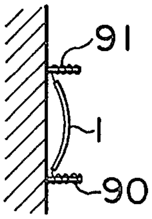

Next the terminal receiving bore 61 in the bit 18 is fitted over the terminal 91 and the switch 7 is operated to rotate the bit 18, whereby the core wire 92 of the trailing end portion 92 of the covered wire 1 is wrapped about the terminal 91 and the wrapping operation is completed as shown in FIG. 18. Thus, the interconnection between the terminals 90 and 91 is completed. The interconnecting operation may be repeated to attain as many interconnections as desired.

As described above, according to the present invention, there can be provided a covered wire wrapping tool in which the wrapping operations of the leading and trailing end portions can be continuously effected from the elongated continuous covered wire 1 with a single bit, simply by the movement of the position of the tool. Since the covered wire wrapping tool of the present invention has only one bit 18, the relative position of the bit to the tool remains unchanged. As a result, the efficiency of the wrapping operation can be increased and the interconnection capability can be remarkably improved. The covered wire wrapping tool in accordance with the present invention uses a minimum number of parts, is compact in size and light in weight and improves the operability considerably as compared with the conventional tools. In addition, according to the present invention, the stationary sleeve and the movable sleeve are prevented from rotating when the bit is being turned so that the entablement of and the damages to the core wires already wrapped may be completely avoided. As a result, satisfactory wrapping quality may be ensured and high density electrical connections can also be made possible.

What we claim is:

1. A covered wire stripping and wrapping apparatus comprising:
   - (a) a covered wire cutting and cover stripping device having cutter blade means and stripping blade means for cutting a covered wire into predetermined lengths and stripping the covering from leading end and trailing end portions thereof, respectively;
   - (b) a wrapping bit device separate from and adjacent to said wire cutting and stripping device, said bit device having a single wrapping bit, a movable sleeve and a movable style guide both of which at least partially surround said wrapping bit, and means for operating said wrapping bit device independent of said cutter and stripping blades for performing a wrapping operation on both said end portions; and
   - (c) a guide device having means for guiding said predetermined length of wire from said wire cutting and cover stripping device to said wrapping bit device.

2. A covered wire wrapping tool, comprising:
   - (a) a covered wire-cutting and cover-stripping device including means for cutting an elongated continuous covered wire into covered wires of a predetermined length and for stripping the covers from leading and trailing ends of a cut covered wire;

(b) a wrapping bit device including a single bit connected to a rotationally driving source and having a terminal receiving bore formed in the tip of said bit in a coaxial relation therewith, an eccentric groove formed in the outer periphery of said bit and extending from the tip of said bit in parallel relation to the axis thereof for receiving the cover-stripped leading and trailing ends, and an opening extending radially across said bit from a rearward end of said eccentric groove for receiving the leading end being inserted through said opening; a style guide reciprocally movable in a direction parallel to the longitudinal axis of said bit on the outside thereof between a first position in which the tip of said style guide is located in an opposed relation to the tip of said bit and a second position in which the tip of said style guide is located in an opposed relation to said opening in said bit, said style guide including an annular portion having a groove formed in the inner surface of the tip of said annular portion for receiving the covered wire; and a sleeve disposed between said bit and said style guide so as to cover said groove in said bit and reciprocally movable in said direction parallel to the longitudinal axis of said bit between a first position in which the tip of said sleeve is located rearward of said opening in said bit and a second position in which the tip of said sleeve is located in an opposed relation to the tip of said bit, in the treatment of the leading end of said sleeve, when moved from its first position to its second position, loading the leading end inserted through said opening, from said opening into said eccentric groove connected to said opening to cause the leading end to reach the tip of said bit to bend the leading end at the tip of said bit so as to draw the leading end through said groove in said style guide, and in the treatment of the trailing end said sleeve, when moved from its first position to its second position, covering the trailing end loaded in said eccentric groove so as not to come out of said eccentric groove;

(c) guide means for guiding the leading end of the covered wire from which a cover is stripped by said covered wire-cutting and cover-stripping device to cause the leading end to pass through said style guide and to be inserted through said opening in said bit;

(d) forcing means for forcing the trailing end of the covered wire from which a cover is stripped by said covered wire-cutting and cover-stripping device into said eccentric groove in said bit; and (e) means for enabling said covered wire-cutting and cover-stripping device to be moved to a position adjacent to the tip of said bit only upon the treatment of the trailing end, the cover-stripped trailing end being positioned adjacent to the tip of said bit and being loaded into said groove to prevent the cover-stripped trailing end from falling off from said groove by said sleeve, thereby to perform the wrapping of the leading and trailing ends by said single bit.

3. A covered wire wrapping tool claimed in claim 1, wherein said sleeve in said wrapping bit device has halved sections so as to cover the outer periphery of the tip of said bit, said halved sections being stationary with respect to rotational movement, and one of said halved sections which is located at the side of said opening being fixed with respect to the axial direction.

4. A covered wire wrapping tool claimed in claim 1, wherein said covered wire-cutting and cover-stripping device includes first clamp means for clamping the leading end of the covered wire fed into said covered wire-cutting and cover-stripping device, second clamp means for clamping the trailing end of the covered wire extending rearward through said groove in said style guide when said style guide is moved to the tip of said bit, said second clamp means being moved rearward together with said style guide after a cover is stripped from the trailing end, and a body including cutter blades reciprocally movable between said first clamp means and said second clamp means in the direction in which the covered wire is fed and openable and closable so as to centrally nip the covered wire along the feeding path of the covered wire to cut the covered wire and stripper blades disposed at opposite sides of said cutter blades and spaced therefrom a predetermined distance, said stripper blades being opened and closed so as to nip the covered wire therebetween to cut a cover.

5. An electric powered tool for wrapping a covered wire, comprising:

A. a wrapping bit device including:
   (1) a single bit including:
      (a) a terminal receiving bore in the tip of said bit in a coaxial relation thereto;
      (b) an opening extending across the diameter of said bit at the location rearward from the tip of said bit a predetermined distance;
      (c) a relief groove in the tip of said bit; and
      (d) an eccentric groove in the outer periphery of said bit from said relief groove to said opening, the wire from which a cover is stripped being loaded into said eccentric groove;
   (2) rotationally driving means for rotating said bit;
   (3) sleeve means for preventing said groove from being exposed upon the rotation of said bit, said sleeve means including at least a movable sleeve, said movable sleeve being mounted on the outer periphery of said bit and being reciprocally movable in a direction parallel to the longitudinal axis of said bit, said movable sleeve being movable toward the tip of said bit to cover said groove to prevent the wire from falling off therefrom and being movable toward the rearward end of said bit to expose said groove;

B. a covered wire-cutting and cover-stripping device including means for cutting an elongated continuous covered wire in optional length and for stripping the cover of a predetermined length from the leading and trailing ends of the cut covered wire;

C. a style guide having an annular portion fitted around the outer periphery of said bit and the outer periphery of said sleeve means and reciprocally movable in the direction parallel to the axis of the bit, said annular portion having formed therein a groove, the covered wire being capable of being passed between said groove and the outer periphery of said sleeve means when said annular portion is fitted on said sleeve means;

D. Leading end guiding means for guiding the leading end so as to draw the cover-stripped leading end from said covered wire-cutting and cover-stripping device and to insert the cover-stripped leading end so as to pass through said opening while being passed through said style guide from the rearward end to the tip of said style guide with said style guide positioned rearward from said opening and with said movable sleeve positioned further rearward from said style guide;

E. Sleeve moving means for reciprocally moving said movable sleeve between a first position in which said movable sleeve is located further rearward from said style guide and a second position in which the tip of said movable sleeve is located in an opposed relation to the tip of said bit, said sleeve moving means being actuatable to move said movable sleeve from said first position to said second position after the leading end is inserted into said opening by said guide means to cause the leading end to be inserted into said groove in said bit inside said movable sleeve and to cause the covered wire successive to the leading end to extend from said relief groove along the outer periphery of said movable sleeve so that the covered wire successive to the leading end extends through said groove in said style guide rearwardly whereupon a terminal is inserted into said terminal receiving bore and said rotationally driving means is driven to perform the wrapping of the leading end;

F. Style guide moving means for reciprocally moving said style guide between a first position in which said style guide is located rearward from said opening and a second position in which the tip of said annular portion of said style guide is located in an opposed relation to the tip of said bit, said style guide moving means being actuated after the completion of the wrapping operation of the leading end to move said style guide from said first position to said second position to cause the covered wire to extend from the terminal around which the trailing end is to be wrapped so as to select a desired length of the covered wire;

G. means for enabling said covered wire-cutting and cover-stripping device to be located at a position in which said covered wire-cutting and cover-stripping device is located in an opposed relation to the tip of said bit only upon the treatment of the trailing end;

H. said covered wire-cutting and cover-stripping device further including trailing end clamp means for urging the covered wire coming out of said groove in said annular portion of said style against said bit at the location adjacent to the rearward end of said annular portion of said style guide located in its second position when said clamp means is located at a position in which said clamp means is located in an opposed relation to the tip of said bit, to clamp the covered wire, said covered wire-cutting and cover-stripping device cutting the covered wire at a location remote from said clamp means a predetermined distance and stripping the cover extending from said clamp means to the cut end of the covered wire from the leading end thereof; and I. means for forcing the leading end exposed by said cover-stripping device into said eccentric groove in said bit, said movable sleeve being moved into its second position and said style guide being moved into its second position after said forcing means forces the trailing end into said eccentric groove, whereupon the terminal around which the trailing end to be wrapped is inserted into said terminal receiving bore and said rotationally driving means driven to perform the wrapping of the trailing end.

* * * * *